(12) United States Patent
Tsai

(10) Patent No.: US 8,657,077 B2
(45) Date of Patent: Feb. 25, 2014

(54) CANTILEVER BRAKE WITH QUICK RELEASE MECHANISM

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 176 days.

(21) Appl. No.: 13/411,628

(22) Filed: Mar. 5, 2012

(65) Prior Publication Data

US 2013/0199877 A1    Aug. 8, 2013

(30) Foreign Application Priority Data

Feb. 8, 2012 (TW) .............................. 101202256 A

(51) Int. Cl.
*B62L 1/14* (2006.01)

(52) U.S. Cl.
USPC ............ 188/24.21; 188/2 D; 188/24.12; 188/24.19; 188/24.22; 188/196 M; 74/502.2; 74/502.4; 74/502.5; 74/502.6; 403/59; 403/60; 403/62

(58) Field of Classification Search
USPC ............ 188/24.21, 24.12, 196 M, 2 D, 24.22, 188/24.19, 71.7, 24.13, 40, 45, 59, 64, 65.2, 188/65.5, 209, 210, 216, 233, 265; 403/59–60, 62; 74/502.2, 502.4, 502.5, 74/502.6
See application file for complete search history.

(56) References Cited

U.S. PATENT DOCUMENTS

| | | | | | |
|---|---|---|---|---|---|
| 4,754,853 | A | * | 7/1988 | Nagano | 188/24.19 |
| 5,060,534 | A | * | 10/1991 | Yoshigai | 74/502.2 |
| 5,293,965 | A | * | 3/1994 | Nagano | 188/24.21 |
| 5,390,767 | A | * | 2/1995 | Nagano et al. | 188/24.19 |
| 5,865,276 | A | * | 2/1999 | Sugimoto | 188/24.21 |
| 2009/0229929 | A1 | * | 9/2009 | Towle | 188/24.19 |

* cited by examiner

*Primary Examiner* — Robert A Siconolfi
*Assistant Examiner* — San Aung

(57) ABSTRACT

A cantilever brake of bicycle is provided with a triangular cable stop including first, second and third corner attachments and a wheel between the first and second corner attachments; a first pivot member including a first trough; a first cable passing through the first corner attachment, the wheel, and the second corner attachment to be fastened at the first pivot; a second pivot member including a second trough; a second cable having one end fastened in the third corner attachment and the other end fastened in the second pivot member; a first brake arm releasably pivotably secured to the first trough and including two opposite first projections and a spring actuated first adjustment knob distal the first projections; and a second brake arm releasably pivotably secured to the second trough and including two opposite second projections and a spring actuated second adjustment knob distal the second projections.

3 Claims, 7 Drawing Sheets

CANTILEVER BRAKE WITH QUICK RELEASE MECHANISM

BACKGROUND OF THE INVENTION

1. Field of the Invention

The invention relates to bicycle brakes and more particularly to a cantilever brake having a quick release mechanism.

2. Description of Related Art

A conventional cantilever brake of bicycle comprises two outwardly-angled arms protruding on both sides respectively, a cable stop on the frame to terminate a cable housing, and a straddle cable between the arms. In a braking operation, a rider may press a brake lever against a grip to pull upwards on the straddle cable, causing the brake arms to rotate up and inward thus squeezing the rim between the brake pads.

However, a number of drawbacks have been found in the conventional cantilever brake. In detail, arrangement for separating a cable stop from either brake arm is not provided. Thus, cable may be drawn into the spokes when the cable is broken. This can cause danger to a rider. Moreover, no elastic force adjuster provided two brake arms. Its adaptability is very poor. Thus, the need for improvement still exists.

SUMMARY OF THE INVENTION

It is therefore one object of the invention to provide a brake device of bicycle comprising a triangular cable stop comprising a first corner attachment, a second corner attachment, a third corner attachment, and a wheel disposed between the first and second corner attachments; a first pivot member comprising a first trough; a first cable passing through the first corner attachment, the wheel, and the second corner attachment to be fastened at the first pivot; a second pivot member comprising a second trough; a second cable having one end fastened in the third corner attachment and the other end fastened in the second pivot member; a first brake arm releasably pivotably secured to the first trough of the first pivot member and comprising two opposite first projections and a spring actuated first adjustment knob distal the first projections; and a second brake arm releasably pivotably secured to the second trough of the second pivot member and comprising two opposite second projections and a spring actuated second adjustment knob distal the second projections.

The above and other objects, features and advantages of the invention will become apparent from the following detailed description taken with the accompanying drawings.

DETAILED DESCRIPTION OF THE INVENTION

Figure 1:
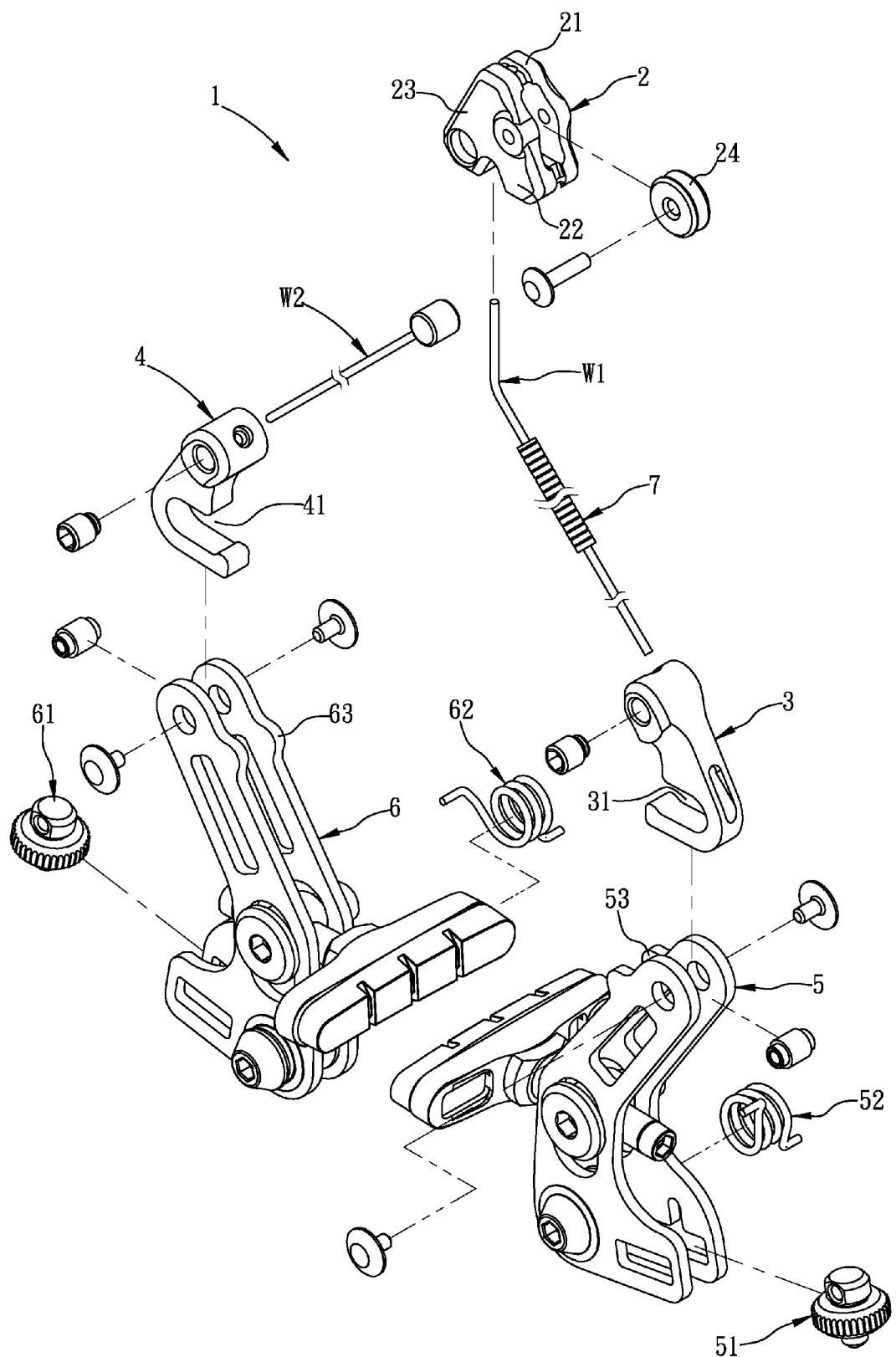
FIG. 1 is an exploded view of a cantilever brake of bicycle according to the invention.
Figure 2:
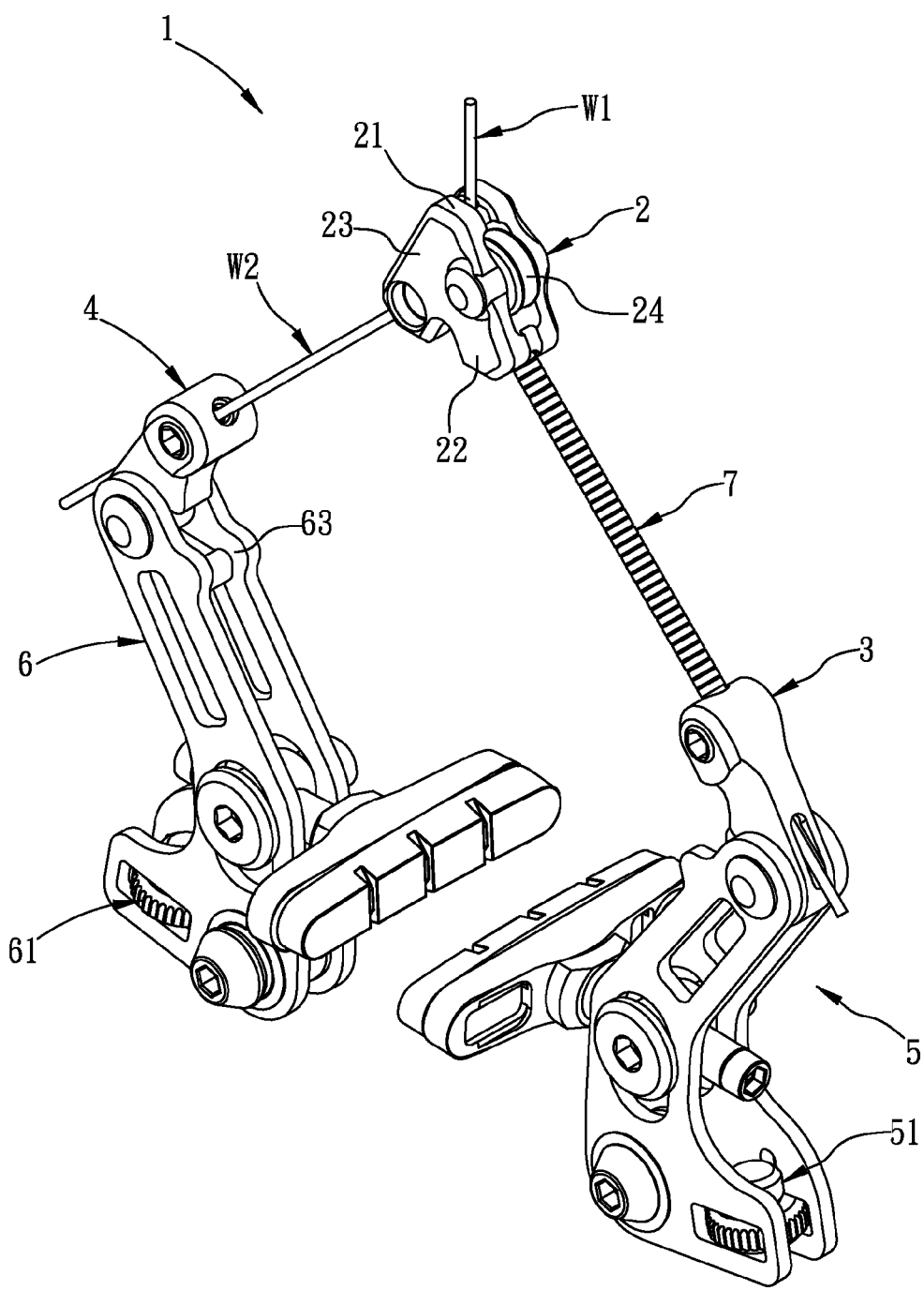
FIG. 2 is a perspective view of the assembled cantilever brake.

Referring to FIGS. 1 to 7, a cantilever brake 1 of bicycle in accordance with the invention comprises the following components as discussed in detail below.

A triangular cable stop 2 comprises a first corner attachment 21, a second corner attachment 22, a third corner attachment 23, and a wheel 24 provided between the first and second corner attachments 21 and 22. A first cable W1 coming from a housing (not shown) near a brake lever (not shown) passes through the first corner attachment 21, the wheel 24, and the second corner attachment 22 before leaving. The provision of the wheel 24 can reduce friction caused by braking force exerted on the first cable W1, i.e., facilitating brake.

A first pivot member 3 is shaped as a hook and comprises a first trough 31 defined by two joining portions. The first cable W1 has one end fastened in the first pivot member 3. Similarly, a second pivot member 4 is shaped as a hook and comprises a second trough 41 defined by two joining portions. A second cable W2 has one end fastened in the third corner attachment 23 and the other end fastened in the second pivot member 4.

A metal sleeve 7 is put on a section of the first cable W1 from the second corner attachment 22 to one end of the first pivot member 3 distal the first trough 31.

Figure 5:
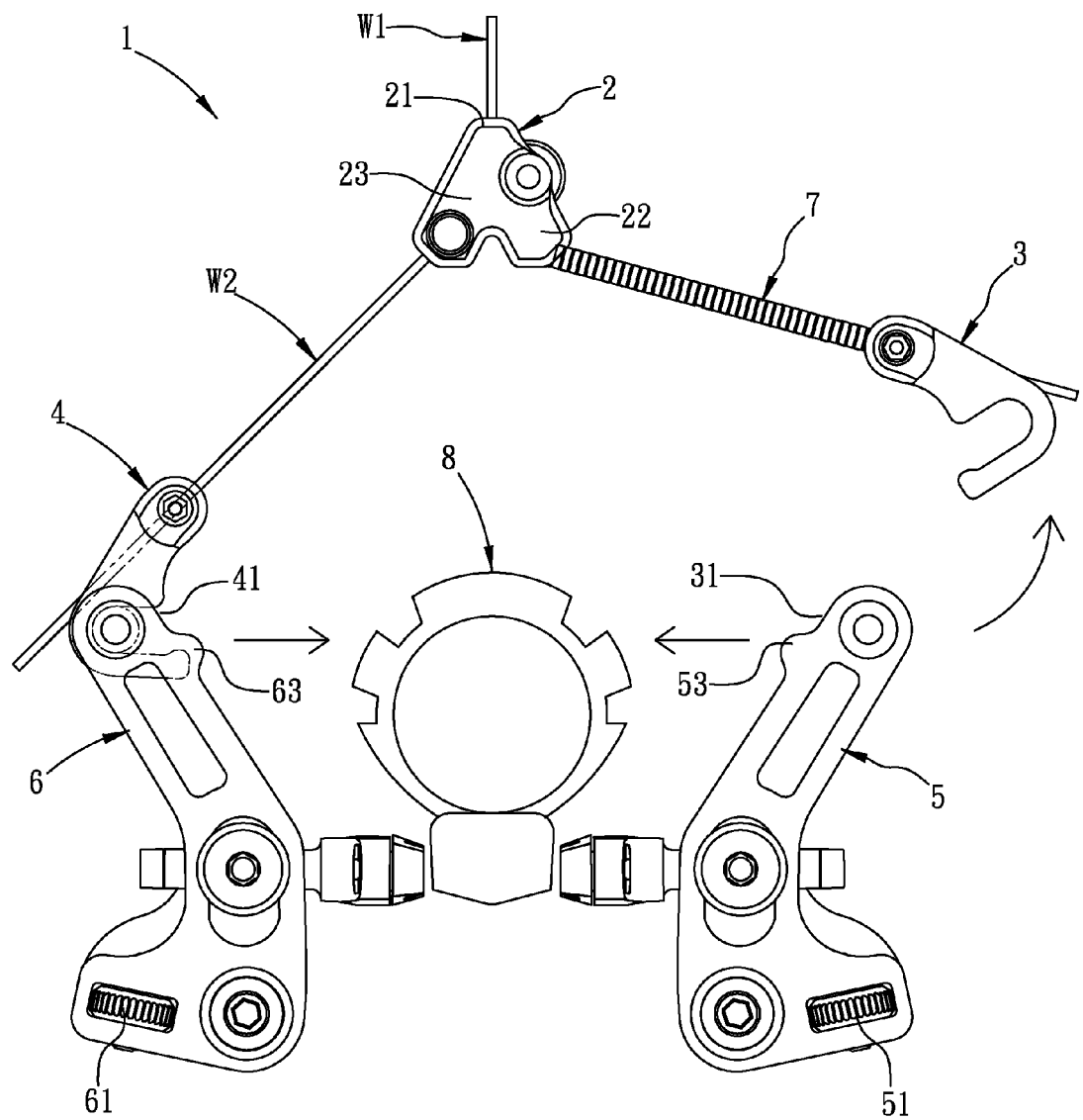
FIG. 5 is a view similar to FIG. 3 showing a quick separation of the first pivot member and the first brake arm.

A first brake arm 5 is releasably pivotably secured to the first trough 31 of the first pivot member 3 (see FIG. 5). The first brake arm 5 comprises two opposite first projections 53 proximate the pivot point, a first adjustment knob 52 disposed in a position distal the first projections 53, and a first torsion spring 52 having one end rotatably secured to an attachment (not numbered) and the other end secured to the first adjustment knob 52.

Figure 4:
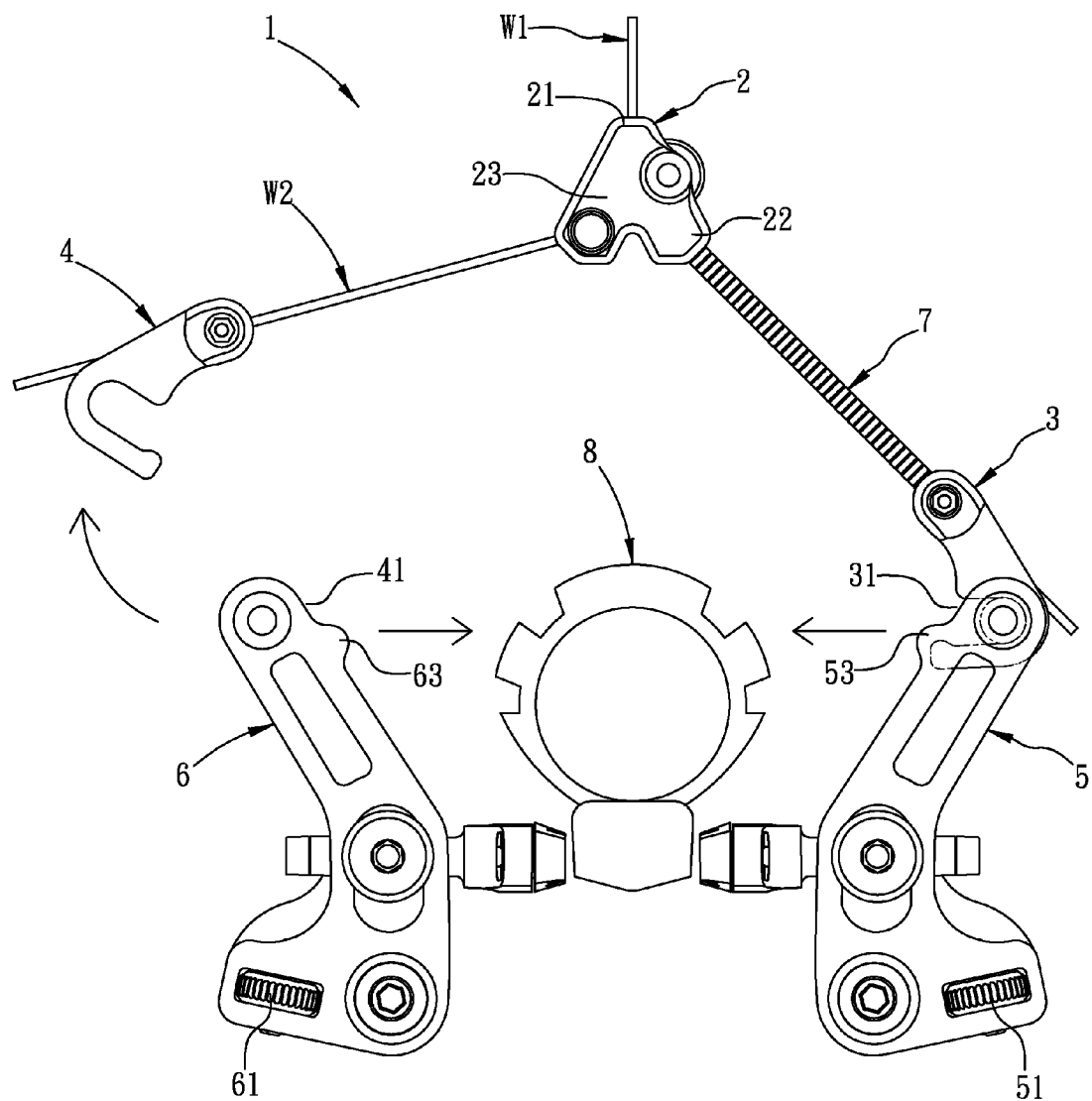
FIG. 4 is a view similar to FIG. 3 showing a quick separation of the second pivot member and the second brake arm.

Similarly, a second brake arm 6 is releasably pivotably secured to the second trough 41 of the second pivot member 4 (see FIG. 4). The second brake arm 6 comprises two opposite second projections 63 proximate the pivot point, a second adjustment knob 62 disposed in a position distal the second projections 63, and a second torsion spring 62 having one end rotatably secured to an attachment (not numbered) and the other end secured to the second adjustment knob 62.

It is envisaged by the invention that an individual may rotate the first adjustment knob 52 to adjust elastic force of the first torsion spring 52 and similarly rotate the second adjustment knob 62 to adjust elastic force of the second torsion spring 62.

Figure 3:
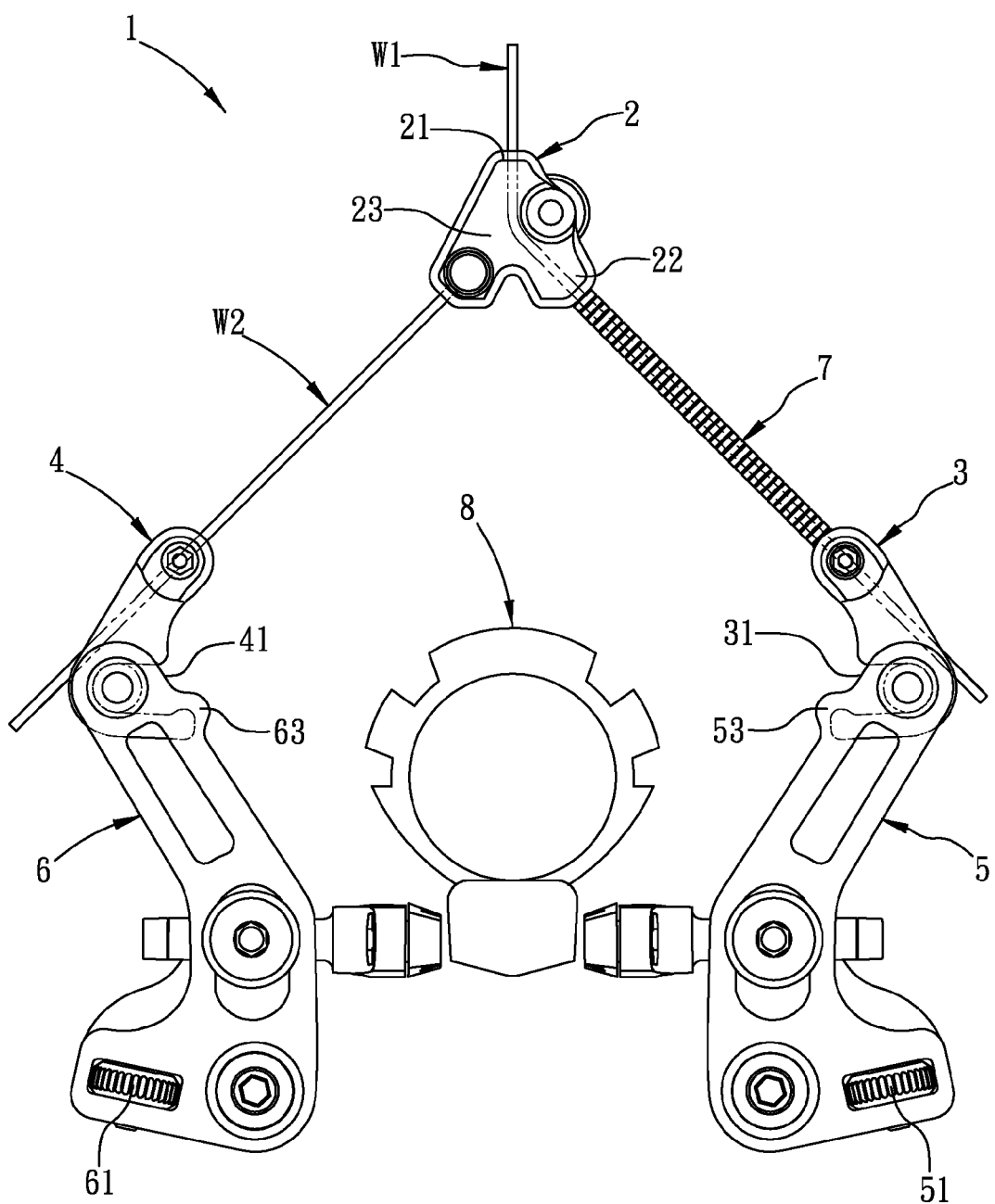
FIG. 3 is a front view of FIG. 2 schematically depicting the cantilever brake mounted on the frame adjacent a wheel.
Figure 6:
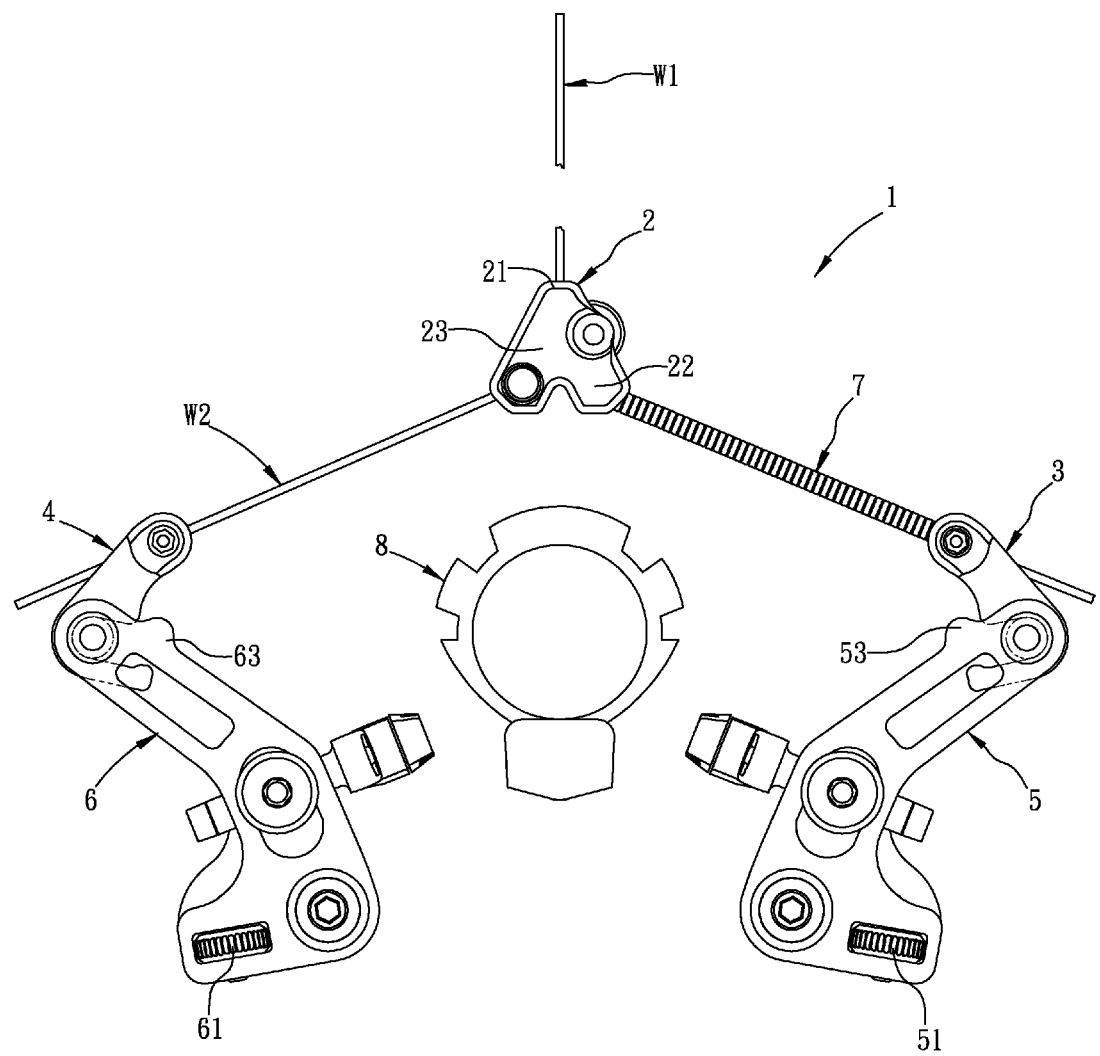
FIG. 6 is a view similar to FIG. 3 showing positions of other components of the cantilever brake after the cable entering the cable stop from a housing near the brake lever being broken.

As shown in FIGS. 3 and 6, in response to the first cable W1 being broken when riding, the first pivot member 3 pivots counterclockwise until contacting the first projections 53 (i.e., being stopped by the first projections 53). This can prevent the first cable W1 from being tangled with the wheel 8. Further, both the first pivot member 3 and the first brake arm 5 are pushed outward by the lowering sleeve 7 (i.e., a section of the first cable W1) and both the second pivot member 4 and the second brake arm 6 are pushed outward by the lowering second cable W2. This also can prevent the first pivot member 3, the first brake arm 5, the second pivot member 4, and the second brake arm 6 from contacting the wheel 8. As a result, driving safety is greatly improved.

Figure 7:
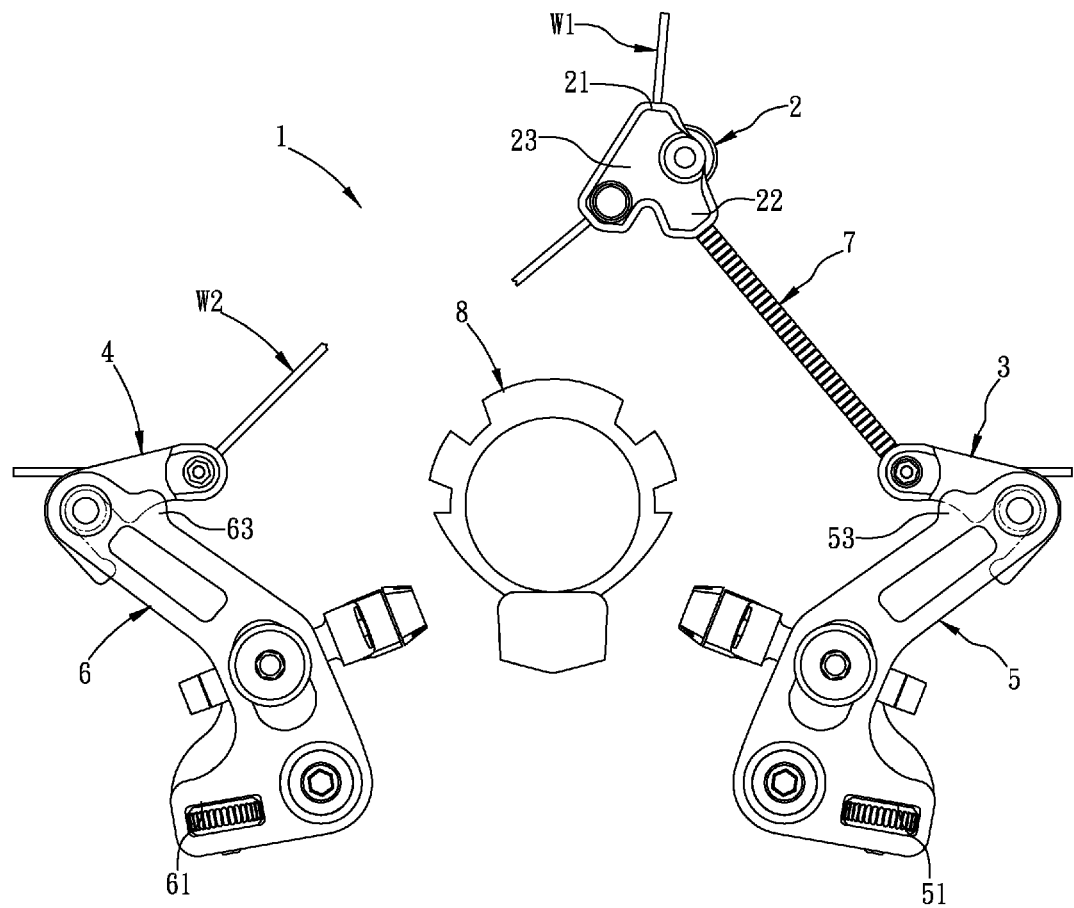
FIG. 7 is a view similar to FIG. 6 showing positions of other components of the cantilever brake after the cable between the cable stop and the second pivot member being broken.

As shown in FIGS. 3 and 7, in response to the second cable W2 being broken when riding, the second pivot member 4 pivots clockwise until contacting the second projections 63 (i.e., being stopped by the second projections 63). This can prevent the second cable W2 from being tangled with the wheel 8. Further, both the first pivot member 3 and the first brake arm 5 are pushed outward by the lowering sleeve 7 (i.e., a section of the first cable W1) and both the second pivot member 4 and the second brake arm 6 are pushed outward by the lowering second cable W2. This also can prevent the first pivot member 3, the first brake arm 5, the second pivot member 4, and the second brake arm 6 from contacting the wheel 8. As a result, driving safety is greatly improved.

While the invention has been described in terms of preferred embodiments, those skilled in the art will recognize that the invention can be practiced with modifications within the spirit and scope of the appended claims.

What is claimed is:

1. A brake device of bicycle comprising:
a triangular cable stop comprising a first corner attachment, a second corner attachment, a third corner attachment, and a wheel disposed between the first and second corner attachments;
a first pivot member comprising a first trough;
a first cable passing through the first corner attachment, the wheel, and the second corner attachment to be fastened at the first pivot;
a second pivot member comprising a second trough;
a second cable having one end fastened in the third corner attachment and the other end fastened in the second pivot member;
a first brake arm releasably pivotably secured to the first trough of the first pivot member and comprising two opposite first projections and a spring actuated first adjustment knob distal the first projections; and
a second brake arm releasably pivotably secured to the second trough of the second pivot member and comprising two opposite second projections and a spring actuated second adjustment knob distal the second projections.

2. The brake device of claim 1, wherein rotation of the first adjustment knob can adjust an elastic force thereof, and rotation of the second adjustment knob can adjust an elastic force thereof.

3. The brake device of claim 1, wherein in response to the first cable being broken when riding, the first pivot member pivots counterclockwise until being stopped by the first projections, both the first pivot member and the first brake arm are pushed away from a wheel, and both the second pivot member and the second brake arm are pushed away from the wheel; and wherein in response to the second cable being broken when riding, the second pivot member pivots clockwise until being stopped by the second projections, both the first pivot member and the first brake arm are pushed away from the wheel, and both the second pivot member and the second brake arm are pushed away from the wheel.

* * * * *